United States Patent [19]
Le Foll

[11] Patent Number: 5,934,710
[45] Date of Patent: Aug. 10, 1999

[54] DEVICE FOR THE SEALED BUTT CONNECTION OF TWO METAL PIPES

[75] Inventor: Marcel Le Foll, Pasly, France

[73] Assignee: Tubest, Fere en Tardenois, France

[21] Appl. No.: 08/936,543

[22] Filed: Sep. 24, 1997

[30] Foreign Application Priority Data

Sep. 27, 1996 [FR] France .................................. 96 12035

[51] Int. Cl.⁶ .................................................. F61L 35/00
[52] U.S. Cl. ........................... 285/39; 285/331; 285/421; 285/424; 285/906; 285/921
[58] Field of Search .................................. 285/424, 921, 285/906, 39, 331, 421, 399, 374

[56] References Cited

U.S. PATENT DOCUMENTS

| | | | |
|---|---|---|---|
| 1,487,389 | 3/1924 | King | 285/424 X |
| 1,791,255 | 2/1931 | Wagner | 285/424 X |
| 2,039,886 | 5/1936 | Cohn | 285/424 X |
| 2,189,159 | 2/1940 | Anschicks | 285/424 X |
| 2,260,221 | 10/1941 | Gray | 285/424 |
| 3,768,457 | 10/1973 | Beasey | 285/424 X |

FOREIGN PATENT DOCUMENTS

| | | | |
|---|---|---|---|
| A 1-247652 | 2/1961 | France . | |
| A 1-249628 | 3/1961 | France . | |
| U 86-03628 | 4/1986 | Germany . | |
| 720375 | 12/1954 | United Kingdom | 285/424 |
| A 884698 | 12/1961 | United Kingdom . | |

*Primary Examiner*—Dave W. Arola
*Attorney, Agent, or Firm*—Oliff & Berridge, PLC

[57] ABSTRACT

A sealing device for the sealed connection of two pipes placed end to end includes an upper component and a lower component. The upper component includes a frustoconical rib extending outward from a cylindrical end part and diverging upward into a first wall forming a return, an elastically deformable external skirt formed from a second wall connected to the frustoconical rib through the return, a circular groove defined between the rib and the skirt and formed by the first and second walls, and a retainer provided in a lower edge of the external skirt. The lower component is matable with the upper component and includes a third wall forming a frustoconical socket that flares upward, a fourth wall forming a frustoconical external skirt diverging downward, and a circular rib formed by merger of the third and fourth walls. The circular rib is sized to enter and come into elastic contact with an internal face of the groove and the retainer snap-fastens under the external skirt of the lower component to fasten the lower component to the upper component.

12 Claims, 3 Drawing Sheets

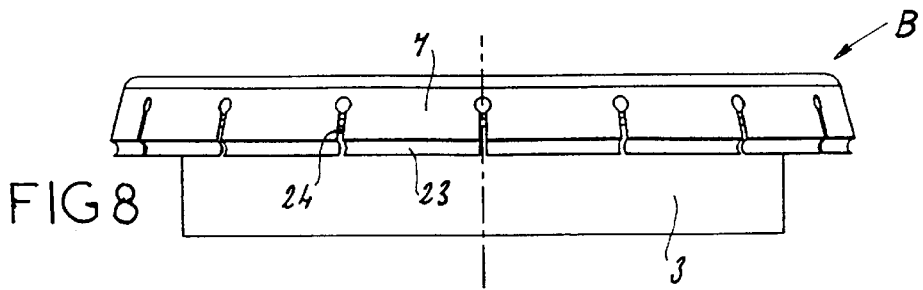
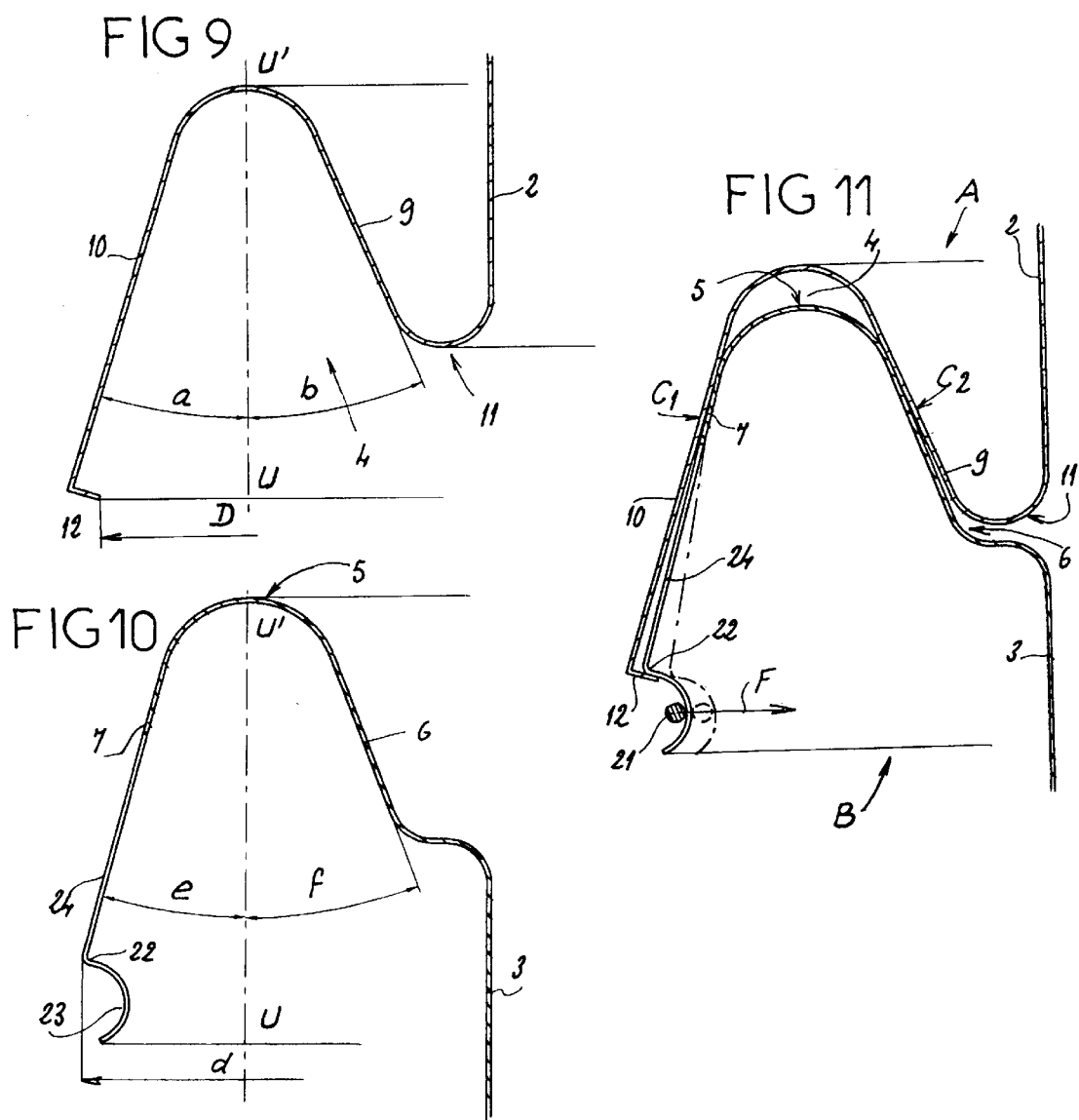

DEVICE FOR THE SEALED BUTT CONNECTION OF TWO METAL PIPES

BACKGROUND OF THE INVENTION

1. Field of Invention

The invention relates to a device for a sealed butt connection of two pipes, made of a material having an ability to deform elastically.

The invention applies to ducts for the removal of combustion smoke coming from boilers, or to ventilation ducts, and in general to all ducts and pipes for the removal of smoke, or gases, through which duct and pipe condensates may also possibly flow.

2. Description of Related Art

Currently, the connection of this type of pipe is provided.

In the case of flexible pipes, by male-female couplings, the female part receiving the upper-level pipe and the male part engaging in the lower-level pipe, this being done so as to ensure flow of the condensates inside the pipe.

The quality of the seal in this type of joint is very imperfect and the fastening of the pipes and of the flexible pipe is by means of screws and/or clamps.

In the case of simple rigid pipes, the connection is provided by a male shaped piece fitting into a female socket formed on the end of the pipe being in the lower position. Fastening is provided by a clamp. A seal may improve the tightness of the system.

In the case of double-walled rigid pipes, with intermediate insulation, joining is made possible by the shaped pieces made on the ends, these often being cylindrical or conical. A clamp enables the two pipes to be clamped against each other.

This connection operation requires labor and accessories, and is therefore expensive. In addition, because of the use of clamps, the degree of tightening of which cannot easily be verified, the quality of the seal is uncertain.

To this should be added the fact that, for pipes not lying horizontally, which is very often the situation for removing condensates, gravity tends to cause the joint components to slip and that, if the clamps are not properly tightened, this slippage may contribute to decreasing the quality of the seal of the joint.

SUMMARY OF THE INVENTION

The object of the present invention is to provide a connection device requiring no tool or accessory and giving a quick joint which is tight and cannot be impaired by the action of gravity.

This device is of the type composed of two complementary components, namely an upper component and a lower component, with respect to the direction of flow of the condensates.

According to the invention, the upper element includes, opposite the lower element, proceeding outward from a cylindrical part, a frustoconical rib which diverges upward and a circular groove surrounding said rib, said groove having an opening cross section and an elastically deformable external skirt, while the lower component includes, opposite the upper element, proceeding outward from a cylindrical part, on the one hand, a frustoconical socket, flaring upward and suitable for housing the rib of the upper component, and, on the other hand, a frustoconical external skirt diverging downward and forming, with the wall of the socket, a circular rib suitable for entering the groove of the upper component and for coming elastically into contact with the internal faces of this groove and, in addition, retaining means which are provided on the lower edge of the external skirt and are suitable for snap-fastening under the edge of the external skirt of the lower component.

In order to connect two pipes using this device, all that is required is to place them so that one lies in the extension of the other and so that the circular rib of the lower component is opposite the groove of the upper component, and then to bring these two pipes together so that the rib opens out the external skirt of the groove elastically and then comes into sealing contact with the internal faces of the walls of this groove, until the means provided on the skirt of the groove snap into position.

When this connection device is placed normally, i.e. so that the rib of the lower component projects upward, the action of gravity which is exerted on the upper pipe improves the gripping of the rib by the groove and has no effect on the lower section, since the rib is jammed into the groove by the retaining means.

Advantageously, the retaining means consist of an elbowed return provided on the end of the external skirt of the groove of the upper component, this return extending approximately in the diametral plane of the upper component and constituting, during connection, the means for opening out this skirt.

Depending on the embodiment, the components of the device are monolithic with the sections of pipe which carry them and are accordingly formed at the ends of these sections, or are added parts fastened to these sections.

The combination of these two embodiments makes it possible, in a plant comprising tubes or pipes of the same diameter but of different types, e.g. flexible pipes, single-walled rigid pipes, insulating double-walled rigid pipes, and even concentric pipes, to connect them using the same device with connection components which are either formed at the ends of the pipes or are added parts fastened to them by welding, riveting, or even screwing, for example by using the helical turns of sections of flexible corrugated pipes.

In one embodiment, the lower end of the skirt of the lower component is provided with an elbowed return directed inward and extended downward by a concave gutter opening to the outside, this gutter being suitable for receiving a circular means for releasing the snap-fastening mechanism and being divided into several sections by slits extending into the skirt.

Thus, in order to disassemble the connection components, all that is required is to introduce a circular clip, or a strong wire, into the gutter and to tighten this clip, or wire, in the gutter in order temporarily to reduce the external diameter of the external skirt of the lower component and allow the rib of the lower component to be removed from the groove of the upper component.

BRIEF DESCRIPTION OF THE DRAWINGS

Other characteristics and advantages will emerge from the description which follows, with reference to the appended diagrammatic drawing showing several embodiments of this connection device.

FIG. 8 is a front elevation of another embodiment of the lower component, FIGS. 9 and 10 are partial sectional views of each of the components in FIG. 8 showing, on a larger scale, the differences in angulation of the groove and of the rib, respectively, FIG. 11 is a partial sectional view of the two components of FIGS. 9 and 10 joined together.

DETAILED DESCRIPTION OF PREFERRED EMBODIMENTS

The connection device is essentially composed of an upper component A and a lower component B. In the embodiment in FIGS. 1 to 6, these two components are formed at the lower and upper ends, respectively, of two metal pipes 2 and 3 which are to be connected and are placed, approximately, one above and one below and in mutual alignment.

Figure 1:
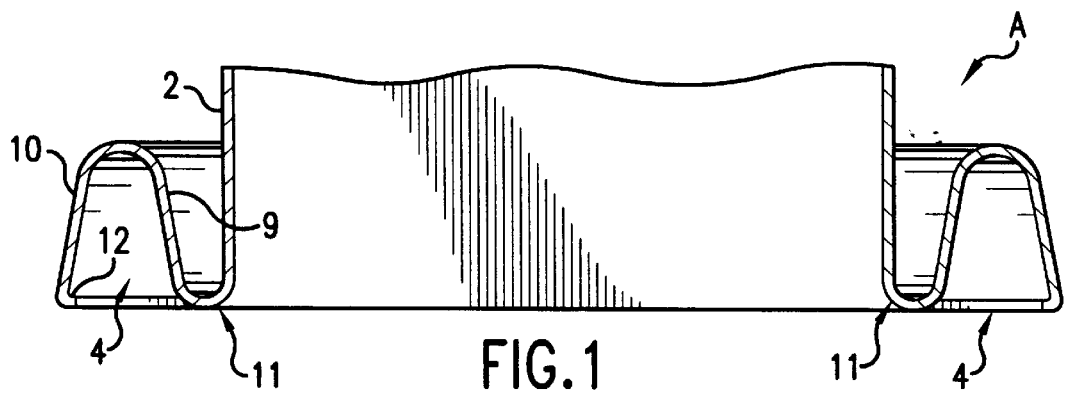
FIGS. 1 and 2 are partial cross sectional views showing a first embodiment of the connection components formed, respectively, at the lower end and at the upper end of two pipes to be connected.
Figure 2:
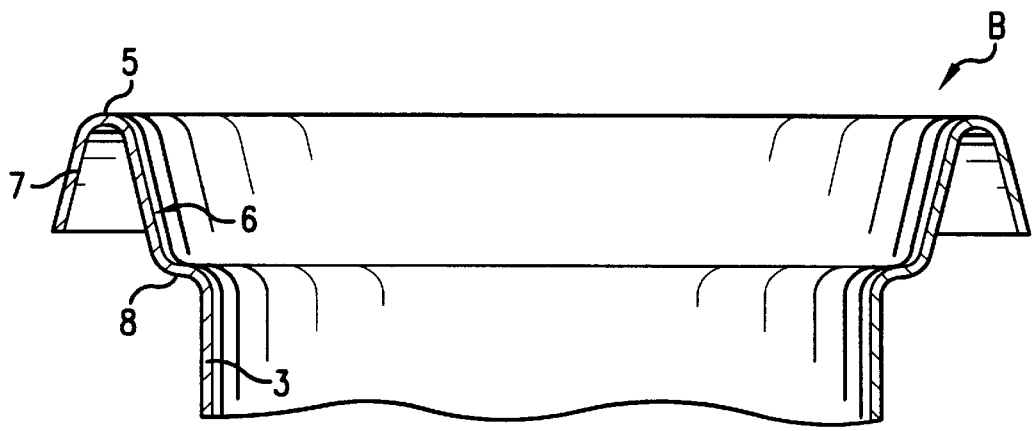

In general, the upper component A, shown in FIG. 1, includes a groove 4, facing downward and having an opening cross section, for example triangular with a rounded apex, and the lower component B (FIG. 2) includes a rib 5 projecting upward and suitable for insertion into the groove 4.

In the embodiment shown in FIGS. 1 to 5, the rib 5 of the lower component B is formed, proceeding from the inside towards the outside, by the wall of a frustoconical socket 6 and by an external skirt 7, which is also frustoconical and surrounds the wall of the socket to which it is joined by a rounded part. This rib therefore has, in cross section, a triangular shape with a rounded top. This rib is connected to the body of the pipe 3 by a return 8, bent one way and then the other way.

The groove 4 of the upper component A is formed, on the one hand, by a frustoconical return 9, bent back around the end of the pipe 2 with which it forms a frustoconical rib 11, and, on the other hand, by a downwardly flaring frustoconical external skirt 10. The return 9 and the skirt 10 are connected by a rounded part. This groove 4 therefore has a triangular cross section with a rounded top.

Figure 4:
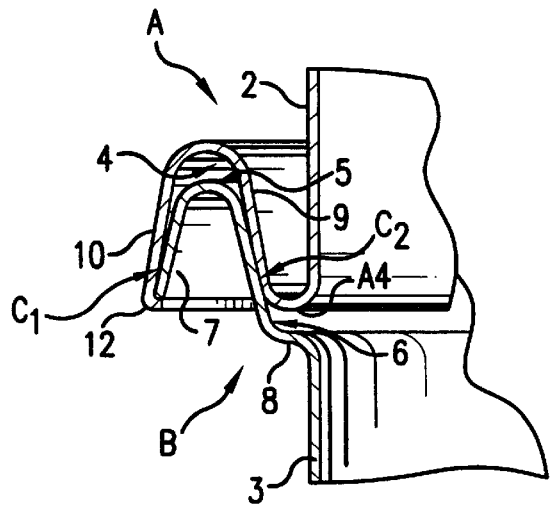

Depending on the application and the materials, the two slopes of each of the conical shapes may or may not be identical and may exhibit symmetrical or unsymmetrical cones. Likewise, the angle formed by the two walls of the groove 4 may have the same value as that formed by the walls of the rib 5 or have a greater or smaller value. In FIG. 4, it has a smaller value, so as to limit the contact area and to obtain, over a localized contact region, a greater elastic clamping force favorable to obtaining superior sealing.

The external skirt 10 of the groove 4 is provided, at its free end, with a retaining means consisting, in this embodiment, of an inwardly elbowed return 12 lying approximately parallel to a diametral plane of the upper connection component.

Figure 3:
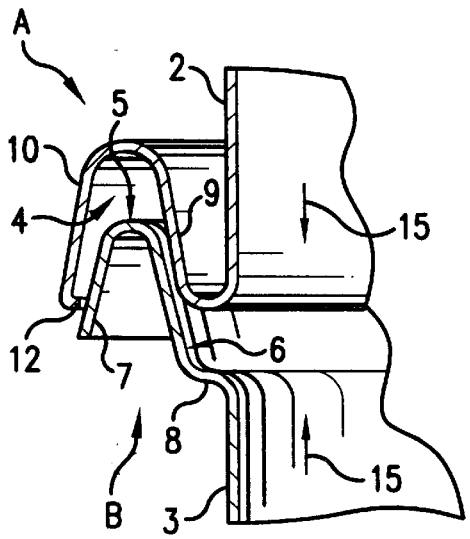
FIGS. 3 and 4 are partial views showing the ends of the two pipes, respectively during connection and after connection.

In order to connect the pipes 2 and 3 end to end, all that is required is to move them closer together, as shown by the arrows 15 in FIG. 3. During this closing-together movement, the elbowed return 12 of the groove 4 comes into contact with the external skirt 7 of the rib 5, thereby causing, on the one hand, the skirt 10 to open out elastically and, on the other hand, the skirt 7 of the rib to move towards the axis of the pipes. This movement is limited by the deformability of this skirt, but also by the contact of the internal face of the socket 6 on the external face of the return 9 of the groove 11 of the upper component A. Thus it is clear that, during this engagement, the socket 6 and the rib 11 interact to ensure axial centering of the two components A and B.

At the end of the engagement, the elbowed return 12 reaches the lower edge of the skirt 7 and, by virtue of the elasticity of the skirt 10 carrying it, snap-fastens under this edge, allowing the internal faces of the groove 4 to come into contact with the external faces of the rib 5, as shown at C1 and C2 in FIG. 4.

At the end of this operation, which is carried out very easily and very quickly, the two pipes 2 and 3 are perfectly connected to each other, both in terms of transverse translational movement, by virtue of the engagement of the rib 5 in the groove 4, and in terms of longitudinal translational movement, in one direction, by the pressure between the bearing surfaces C1, C2 and, in the other direction, by locking by means of the rim 12.

It will be noted that the action of gravity on the upper pipe 2 improves the contact and, consequently, the sealing between the opposing faces of the rib 5 and the groove 4.

It will also be noted that when the components A and B satisfy the direction of fitting shown, this connection device has no effect on the flow, in the pipes, of a liquid or of condensates. Furthermore, the contacts C1 and C2 provide not only sealing but also stability of the joint, even when the longitudinal axes of the pipes 2 and 3 are not vertical.

Figure 5:
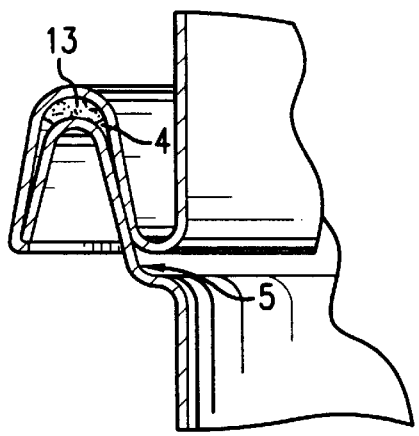
FIGS. 5 and 6 are partial sectional views showing alternative embodiments of this connection device.

In the embodiment shown in FIG. 5, the groove 4 contains a compressible seal 13 which supplements the sealing provided by the contact between the opposing faces of the groove 4 and the rib 5.

Figure 6:
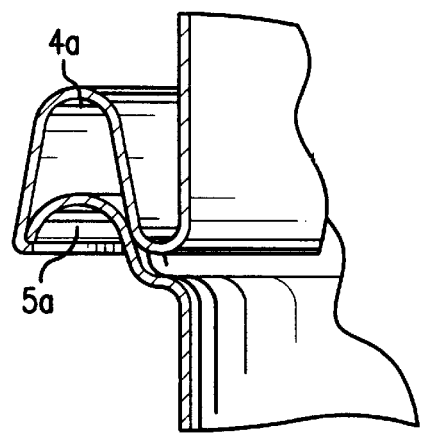

In the embodiment shown in FIG. 6, the rib 5a has a semicircular cross section and is engaged in a groove 4a identical to the groove 4 of the previous embodiment.

This demonstrates that the invention is not limited to the cross sections of the ribs described above, but encompasses all variants thereof as long as the groove 4 has an opening cross section, i.e. allowing disengagement of the rib, and as long as its skirt 10 is provided with a retaining means which snaps on elastically under the external edge of the rib.

The connection elements A and B are produced by forming, either directly on the ends of the pipes which have to be connected or on the ends of cylindrical bodies which are fixed, by welding, by riveting, by a wedge, by adhesive bonding or screwing, to the ends of the pipes which have to be connected. The latter approach is intended, in particular for ringed or corrugated pipes.

Figure 7:
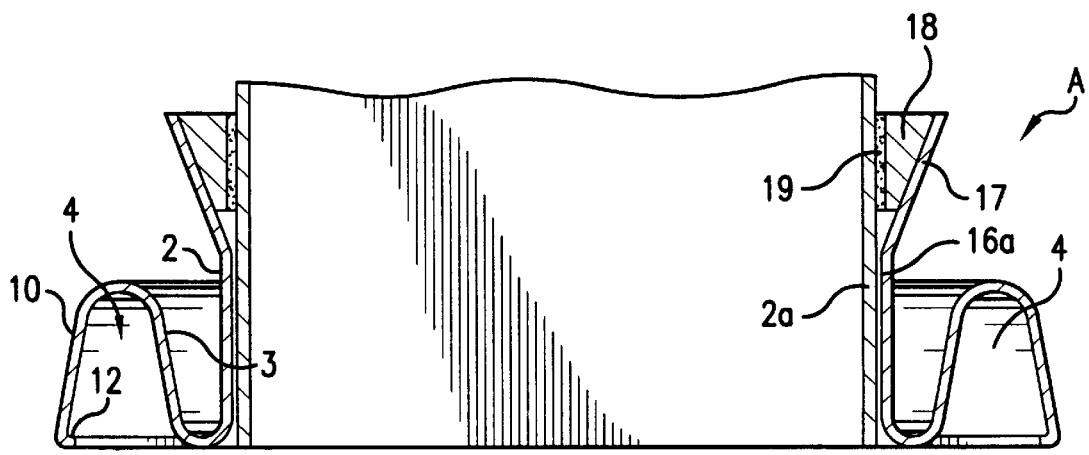
FIG. 7 is a partial cross sectional view showing the ends of two pipes fitted with added connection components.
Figure 7:
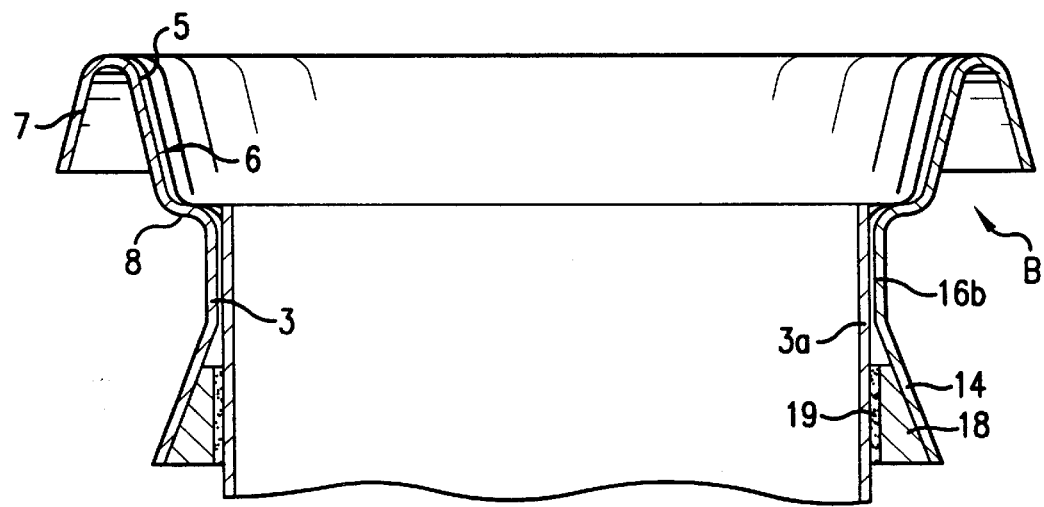

FIG. 7 shows a particular embodiment of a connection device which can be attached to the cylindrical ends of pipes 2a, 3a.

Each of the connection components, the upper component A and the lower component B, is integral with a sleeve 16a, 16b, the opposite end of which from that provided with the connection means is shaped into a diverging cone 17. The internal face of this cone is intended to serve as a bearing face to a frustoconical ring 18 which is slidingly fitted onto, and around, the corresponding pipe 2a, 3a. The cylindrical internal face of this ring, and optionally its conical external face, may have striations 19 which improve the anchoring after wedging and prevent it from becoming unwedged. Moreover, it will be noted that the action of gravity, being exerted on the upper pipe 2a and then, via the upper component A, on the lower component B, ensures that the joint between each pipe and its connection component is self-wedging.

FIGS. 8 to 11 show another embodiment of this connection device. The skirt 7 of the lower component B is provided, at its lower end, with an elbowed return 22 facing inward and extended by a concave, for example approximately semicircular, gutter 23. This gutter is divided into sections by longitudinal slits 24, angularly spaced apart, extending into the skirt 7. The width of each slit and the number of slits are determined so that, when the skirt 7 is squeezed radially by a circular means 21 inserted into the gutter 23 for releasing the snap-fastening mechanism, the outside diameter d of the skirt is less than the diameter D of the opening delimited, in the upper component A, by the elbowed return 12.

This arrangement therefore enables the two components A and B of the device to be disassembled by using a means consisting either of a tool having a clip which is inserted into the gutter and which enables radial forces (F, FIG. 11) to be exerted upon it, these forces being peripherally distributed, or, more simply, by a filament of strong material, such as a steel wire or a fishing line of large cross section, which is placed in the gutter and the rotation of the ends of which causes this gutter to be squeezed radially.

After the two components A and B have been disassembled, the means for releasing the snap-fastening mechanism is removed so that, by elasticity, the gutter portions and the skirt resume their initial position, ready for a subsequent joining operation.

FIGS. 9 and 10, relating to an embodiment providing a good joint, show the differing angles of the frustoconical walls with respect to an axis U'U parallel to the longitudinal axis of the components A and B. Thus, for the upper component A, the angle a of the skirt 10 with respect to this axis U'U has a value of about 17° and is less than the value of the angle b, which is about 27°, formed between this axis and the return 9.

In the lower component B, the angle e of the skirt 7 with respect to the axis U'U has a value which is less than that of the angle a, which corresponds to it in the upper component and which may be, for example, about 15°. As regards the angle f of the socket 6, this has a value which is less than the value of the angle b, corresponding to it, and which is about 26°.

By virtue of this arrangement, when the two components A and B are joined together, the walls of the rib 5 come into contact with those of the groove 4 at C1 and C2, as shown in FIG. 11.

The connection device according to the invention can be applied to any metal pipe made in a metal providing a degree of elasticity, such as steel, or stainless steel, but also in certain moldable synthetic materials.

It is apparent from the foregoing that the connection device according to the invention makes it possible to dispense with conventional connections using a clamp, and with the supply and installation costs inherent in them, while still providing a reliable connection.

This device can be used on rigid pipes or on flexible pipes for taking smoke from the outlet of a boiler and discharging it outside the building, but also on non-insulated double-walled ducts, called suckers, and on insulated double-walled ducts.

I claim:

1. A device for the sealed connection of two pipes placed end to end, comprising:

an upper component including a frustoconical rib extending outward from a cylindrical end part and diverging upward into a first wall forming a return, an elastically deformable external skirt formed from a second wall connected to the frustoconical rib through the return, a circular groove defined between the rib and the skirt and formed by the first and second walls, and a retainer provided in a lower edge of the external skirt;

a lower component matable with the upper component and including a third wall forming a frustoconical socket that flares upward, a fourth wall forming a frustoconical external skirt diverging downward, and a circular rib formed by merger of the third and fourth walls, wherein the circular rib is sized to enter and come into elastic contact with an internal face of the groove to seal the two pipes and the retainer snap-fastens under the external skirt of the lower component to fasten the lower component to the upper component.

2. The device according to claim 1, wherein the circular groove of the upper component and the rib of the lower component have, in cross-section, a triangular shape with a rounded top.

3. The device according to claim 2, wherein an angle formed by the first and second walls of the groove is identical to an angle formed by the third and fourth walls of the rib.

4. The device according to claim 2, wherein an angle formed by the first and second walls of the groove has a value different from that of an angle formed by the third and fourth walls of the rib.

5. The device according to claim 1, wherein the retaining means includes an elbowed return provided on an end of the external skirt of the groove of the upper component, the elbowed return extending approximately in a diametral plane of the upper component and constituting, during connection, means for outwardly opening the skirt.

6. The device according to claim 1, wherein a bottom of the groove contains a compressible seal.

7. The device according to claim 1, wherein at least one of the upper component and the lower component is monolithic with a section of one of the two pipes.

8. The device according to claim 1, wherein at least one of the upper component and the lower component is an added part fastened to a section of one of the two pipes.

9. The device according to claim 8, wherein each of the upper component and the lower component is integral with a sleeve which is provided, at its opposite end from the rib, with a divergent conical part and a frustoconical wedging ring.

10. The device according to claim 1, wherein a lower end of the skirt of the lower component is provided with an elbowed return directed inward and extended downward by a concave gutter opening to the outside, the gutter receiving a circular means for releasing the retainer and being divided into several sections by slits extending into the skirt.

11. A pipe for forming a sealing connection, wherein one end of the pipe comprises a frustoconical rib diverging from the pipe toward an opposite end of the pipe, an elastically deformable external skirt provided with a retainer, and a circular outwardly diverging groove defined between the frustoconical rib and the external skirt.

12. A pipe for forming a sealing connection, wherein one end of the pipe comprises a frustoconical socket forming an interior wall of the pipe, and a circular rib formed at a merger of the frustoconical socket and a frustoconical external skirt, the frustoconical external skirt diverging from said frustoconical socket at the merger toward an opposite end of the pipe.

* * * * *